United States Patent
Radhakrishnan et al.

(10) Patent No.: US 9,341,220 B2
(45) Date of Patent: May 17, 2016

(54) BRAKE PAD RETENTION DEVICE AND METHOD

(71) Applicant: Bendix Spicer Foundation Brake LLC, Elyria, OH (US)

(72) Inventors: Harish Radhakrishnan, Westlake, OH (US); Dennis A. Wolf, Westlake, OH (US); Ronald S. Plantan, Mooresville, NC (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 196 days.

(21) Appl. No.: 13/940,960

(22) Filed: Jul. 12, 2013

(65) Prior Publication Data

US 2015/0014103 A1 Jan. 15, 2015

(51) Int. Cl.
*F16D 65/40* (2006.01)
*F16D 65/00* (2006.01)
*F16D 65/12* (2006.01)
(Continued)

(52) U.S. Cl.
CPC ........ *F16D 65/0006* (2013.01); *F16D 65/0043* (2013.01); *F16D 65/0977* (2013.01); *F16D 65/0978* (2013.01); *F16D 65/12* (2013.01); *F16D 2065/1396* (2013.01); *Y10T 29/49945* (2015.01)

(58) Field of Classification Search
CPC . F16D 65/0006; F16D 65/12; F16D 65/0043; F16D 2065/1396; F16D 65/097; F16D 65/095; F16D 65/0972; F16D 65/0978; F16D 65/0979; F16D 65/092; F16D 55/227; F16D 2055/0008; F16D 2055/0016; F16D 2055/00916; F16D 65/0977; Y10T 29/49945

USPC ............... 188/73.38, 73.31, 234, 250 R, 258, 188/250 E, 250 B
See application file for complete search history.

(56) References Cited

U.S. PATENT DOCUMENTS 3,710,896 A   1/1973  Machek
4,180,148 A * 12/1979  Souma ........................ 188/73.38
(Continued)

FOREIGN PATENT DOCUMENTS

EP   1 809 921 B1   4/2008
GB   1 577 856       10/1980

OTHER PUBLICATIONS

International Search Report dated Nov. 14, 2014 (Three (3) pages).
(Continued)

*Primary Examiner* — Pamela Rodriguez
(74) *Attorney, Agent, or Firm* — Crowell & Moring LLP

(57) ABSTRACT

A brake pad retaining device is provided for holding a brake pad within a brake caliper of an air disc brake system. The device may be formed as a spring which provides at least four retention forces at longitudinal ends of the brake pad in order to suppress brake pad kick motion and vibration, while applying a biasing force that pre-loads a caliper to its mounting pins. The device may include a mounting section that is coupled to a brake carrier, a first projection and a second projection. The first projection extends from one region of the mounting section to a region near a longitudinal end of the brake pad to thereby exert a radially inward force against the brake pad. The second projection extends from another region of the mounting section to an inner surface of the brake caliper to thereby exert a biasing force against the brake caliper.

28 Claims, 8 Drawing Sheets

(51) Int. Cl.
    *F16D 65/097*     (2006.01)
    *F16D 65/02*     (2006.01)

(56) References Cited

U.S. PATENT DOCUMENTS

| | | |
|---|---|---|
| 4,243,123 A | 1/1981 | Watanabe |
| 4,245,723 A | 1/1981 | Moriya |
| 4,618,034 A | 10/1986 | Weber et al. |
| 4,905,796 A | 3/1990 | Schonenberger et al. |
| 6,527,090 B1 * | 3/2003 | Barillot et al. ............ 188/73.38 |
| 7,086,506 B2 | 8/2006 | Wemple et al. |
| 7,644,809 B2 | 1/2010 | Cortinovis et al. |
| 8,205,726 B2 | 6/2012 | Schorn et al. |
| 9,097,304 B2 * | 8/2015 | Plantan et al. ................ 188/313 |
| 2005/0274579 A1 * | 12/2005 | Nogiwa ..................... 188/73.38 |
| 2006/0070828 A1 * | 4/2006 | Hendrich et al. .......... 188/73.31 |
| 2007/0261927 A1 | 11/2007 | Iraschko et al. |
| 2009/0159376 A1 | 6/2009 | Rossignol et al. |
| 2010/0243389 A1 * | 9/2010 | Miura et al. .............. 188/206 R |

OTHER PUBLICATIONS

Written Opinion (PCT/ISA/237) dated Nov. 14, 2014 (Seven (7) pages).

International Preliminary Report on Patentability (PCT/IB/326 & PCT/IB/373) issued in PCT Application No. PCT/US2014/046333, including Written Opinion (PCT/ISA/237) dated Jan. 21, 2016 (nine (9) pages).

* cited by examiner

BRAKE PAD RETENTION DEVICE AND METHOD

FIELD

The present disclosure relates to disc brakes for vehicles. In particular, the present disclosure relates to devices for retaining brake pads within the brake caliper of an air disc brake system of the type utilized on commercial vehicles, and to a method of using such devices.

BACKGROUND

Pneumatically-operated disc brakes have undergone development and deployment on commercial vehicles since at least the 1970s, where they have come to replace drum-style brakes due to their superior performance in regard to cooling, fade resistance and serviceability. Brake pads in pneumatically-operated disc brakes are commonly retained within brake calipers using a hold down bar that straddles the brake pads and the brake disc on top of the brake caliper. During braking, as the radially-stationary brake pad is brought into contact with the rotating brake disc, the rotation of the brake disc tends to rotate a leading edge of the brake pads in an radially-outward direction, and the trailing edge of the brake pads in a radially-inward direction, in a phenomenon known as "brake pad kick." Because these caliper-mounted hold down bars do not hold down the brake pads near their longitudinal ends, these brake pad hold down bars are not intended to suppress brake pad kick. Further, because these hold down springs provide only a single retaining point along the length of the brake pad, these hold down bars may be less effective at suppressing brake pad vibration during brake operation.

SUMMARY

In some instances, the ability of u-shaped brake pad hold down springs or bars to suppress brake pad kick and to reduce brake pad vibration during brake operation decreases as the brake pads wear down. This is at least in part because the u-shaped brake pad hold down springs are mounted directly onto the brake pad, and therefore, the force exerted by these u-shaped brake pad hold down springs decreases as the brake pads wear down. The present invention addresses these and other problems in the related art. This is achieved by a brake pad retention device which is mounted directly onto the brake carrier, thereby providing an improved ability to suppress brake pad kick and brake pad vibration, increased product longevity due to a reduction of uneven and vibration-induced wear, improved ability to preload the brake caliper mounting pins to even further suppress brake vibration, and improved ease of brake pad installation and removal.

In accordance with embodiments of the present invention, the ability to suppress brake pad kick, brake pad vibration, and brake pad vibration-induced wear irrespective of the wear condition of the brake pad friction material, is enhanced by utilizing a brake pad hold down device, preferably in the form of a spring member, that is fastened to the brake carrier and that includes at least four contact points (e.g., one contact point on each end of the brake pad), which exert a retaining force on the brake pad to suppress brake pad kick. Further, the brake pad hold down spring may be configured to simultaneously exert a force against inner surfaces of the brake caliper, biasing the caliper against its brake caliper mounting pins, thereby effectively preloading the brake caliper on its mounting pins to further suppress vibration.

In one embodiment, the brake pad hold down spring includes a mounting section that is coupled to a brake carrier, a first projection that extends from one region of the mounting section, and a second projection that extends from another region of the mounting section. Preferably, the mounting section has a shape that is complimentary to a surface of the carrier upon which the mounting section is mounted, and includes at least one opening that allows for the passage of a fastener which fixes the mounting section to the carrier. The first projection extends from the mounting section to the brake pad. Preferably, the first projection contacts the backing plate of the brake pad at a region near a longitudinal end of the brake pad, where the first projection exerts a downward (i.e., radially-inward) force against the backing plate of the brake pad. Thus, the first projection preferably has a shape that is complimentary to a contact surface on the backing plate of the brake pad. The second projection extends from the mounting section to the brake caliper. Preferably, the second projection contacts an inner surface of the brake caliper, where the second projection exerts a biasing force against the inner surface of the brake caliper. Thus, the second projection preferably has a shape that facilitates the transfer of a biasing force from the second projection to an inner wall of the brake caliper. This arrangement suppresses brake pad kick and brake pad vibration by providing at least four contact points (e.g., two contact points on each end of the brake pad) that exert a retaining force on each brake pad. Additionally, this arrangement greatly facilitates removal and installation of the brake pads, as all that is required to install or remove the brake pads after wheel removal is to push the first projection laterally away from the brake pad in the circumferential direction (i.e., away from the brake pads) to thereby interrupt contact between the first projection and the backing plate of the brake pad. The brake pads may then simply slide into/out of the brake caliper.

The brake pad hold down spring may be provided with an elongated body having opposite ends which are each connected to the brake pad hold down spring described above, each of which can provide retention of a pair of opposing brake pads. That is, the brake pad hold down spring may further include an elongated body having opposite ends, each of which includes a mounting section that is coupled to a brake carrier, a first projection that extends from one region of the mounting section, and a second projection that extends from another region of the mounting section. The elongated body extends over the brake disc, without interfering with rotation of the brake disc, and may optionally be used, for example, to guide a wear sensor from the wiring harness of the vehicle to a location on the brake pad where the wear sensor is installed. Thus, this arrangement also provides at least four contact points (e.g., two contact points on each end of a brake pad) that exert a retaining force. The brake pad hold down spring including the elongated body, however, exerts a retaining force onto two different brake pads, which are positioned on opposite sides of the brake disc. The brake pad hold down spring including the elongated body exhibits the same advantages described above, as well as increased rigidity and support.

Other objects, advantages and novel features of this disclosure will become apparent from the following detailed description of embodiments, when considered in conjunction with the accompanying drawings, in which:

DESCRIPTION OF EMBODIMENTS

Figure 1:
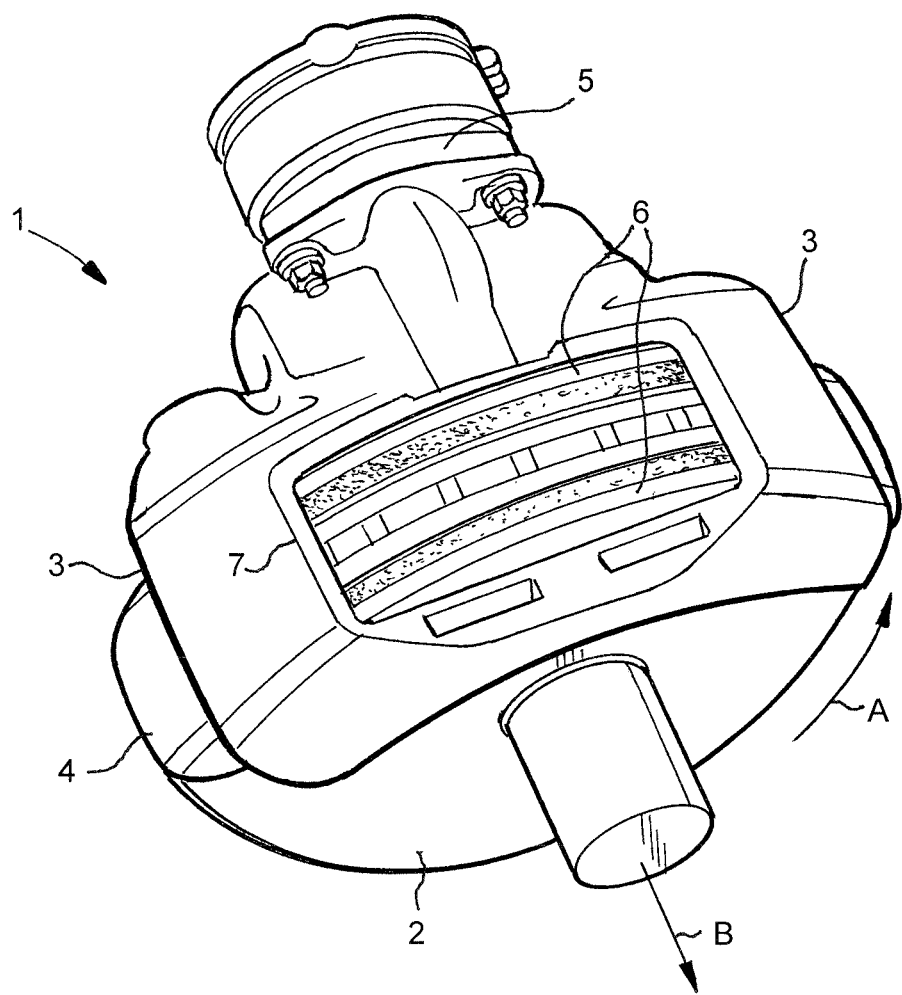
FIG. 1 is a perspective view of a brake system in accordance with an embodiment of the present invention.

FIG. 1 depicts a brake system 1 of the type generally used in commercial vehicles. The brake system 1 includes a brake disc 2 and a brake caliper 3 straddling the brake disc 2. The brake caliper 3 is affixed to a brake carrier 4, via a pair of brake caliper mounting pins. The brake carrier 4 is in turn fixed to a vehicle axle (not illustrated), typically via a torque plate or a brake spider (not illustrated). The brake caliper 3 is actuated by an actuator 5, which in some embodiments may be controlled by pneumatic pressure from the vehicle. The actuator 5 acts upon a brake pad application mechanism contained within brake caliper 3 to press brake pads 6 against the brake disc 2 and thereby slow the vehicle. In the embodiment of FIG. 1, the brake caliper 3 is provided with an aperture 7 which is wide enough in the circumferential direction A and the axial direction B to allow the brake pads 6 to be removed and inserted without removal of the brake caliper 3 from the brake carrier 4. Embodiments of the present invention, however, need not be limited to a pneumatic actuator. For example, in alternate embodiments an electrically-driven, or a hydraulically-driven actuator may be used. Further, embodiments of the present invention need not be limited to a particular type of brake caliper/mount arrangement. For example, in alternate embodiments a fixed carrier and a sliding caliper with a single-side brake pad application mechanism, or a fixed carrier and fixed caliper with two-sided brake pad application mechanisms may be used.

Figure 2:
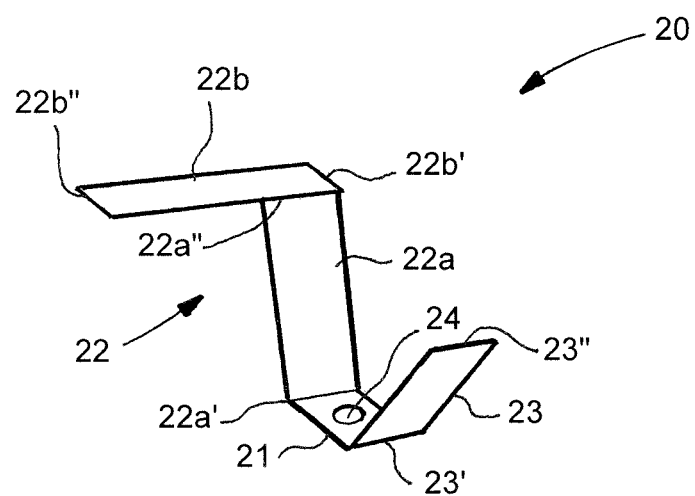
FIG. 2 is a perspective view of a brake pad hold down spring in accordance with an embodiment of the present invention.

FIG. 2 depicts a brake pad hold down device in accordance with an embodiment of the present invention. As shown in FIG. 2, the brake pad hold down device may be provided in the form of a brake pad hold down spring 20 that includes a mounting section 21 having a shape that corresponds to a surface on the brake carrier 4, upon which the mounting section 21 is mounted. In some embodiments, such as the embodiment shown in FIG. 2, the mounting section 21 may have a substantially flat shape. The shape of mounting section 21, however, need not be limited to such flat shape, and may have any desired shape as may occur to those of ordinary skill in the art, provided that the shape of the mounting section 21 and the corresponding region of the brake carrier 4 are complimentary to one another. Further, the mounting section 21 may have any desired profile. For instance, as depicted in FIG. 2, the mounting section 21 may have a substantially rectangular profile. The mounting section 21, however, need not be limited to such profile, and may have any circular, semi-circular, or polygonal profile as may occur to those of ordinary skill in the art, as long as the mounting section 21 is capable of being fixed to brake carrier 4.

As shown in the embodiment depicted in FIG. 2, the mounting section 21 may form at least one opening 24, through which a fastener (not illustrated) that fastens the mounting section 21 to the brake carrier 4 may be inserted. The number of openings 24, however, need not be limited to a single opening 24, and may include two or more openings 24, or as many openings 24 as may occur to those of ordinary skill in the art, or as may be necessary to fasten the mounting section 21 to the brake carrier 4. Moreover, in alternate embodiments, the mounting section 21 may be devoid of any openings 24, and may instead be fixed to brake carrier 4 by alternate methods, such as welding or any other means as may occur to those of ordinary skill in art.

As shown in FIG. 2, the brake pad hold down spring 20 of the present embodiment includes a first projection 22 that extends from one end of the mounting section 21. The first projection 22 may include a vertical section 22a and a horizontal section 22b. The vertical section 22a may have a proximal end 22a' that is immediately adjacent to the mounting section 21 and that extends substantially in a vertical direction (e.g., radially outward) from the mounting section 21 to distal end 22a" of the vertical section 22a. In some embodiments, the vertical section 22a may form a right angle with respect to the mounting section 21. The vertical section 22a, however, need not be limited to such arrangement and may form any angle with respect to the mounting section 21 as may occur to those of ordinary skill in the art. The horizontal section 22b includes a proximal end 22b' that extends from a region of the horizontal section 22b that is proximate to distal end 22a" to a distal end 22b" of the horizontal section 22b generally parallel to an axis of rotation of the brake disc system so as to extend over the brake pad 6. As shown in FIG. 2, the brake pad hold down spring 20 of the present embodiment may also include a second projection 23 in the form of a reaction tab/caliper pre-loading tab extending from a proximal end 23' that is immediately adjacent to the mounting section 21 to a distal end 23" that is arranged to contact an interior surface of the brake caliper 3.

As shown in the embodiment of FIG. 2, the first projection 22 and the second projection 23 may extend from different regions (e.g., opposite ends) of mounting section 21. The projecting direction of the first projection 22 and the second projection 23, however, need not be limited to such arrangement. For instance, in other embodiments, the first projection 22 and the second projection 23 may extend from sides of the mounting section 21 that are immediately adjacent to one another, or from the same side of the mounting section 21, as long as a first end and a second end of the brake pad hold down spring 20 contact brake pad 6 and brake caliper 3, respectively.

Figure 3:
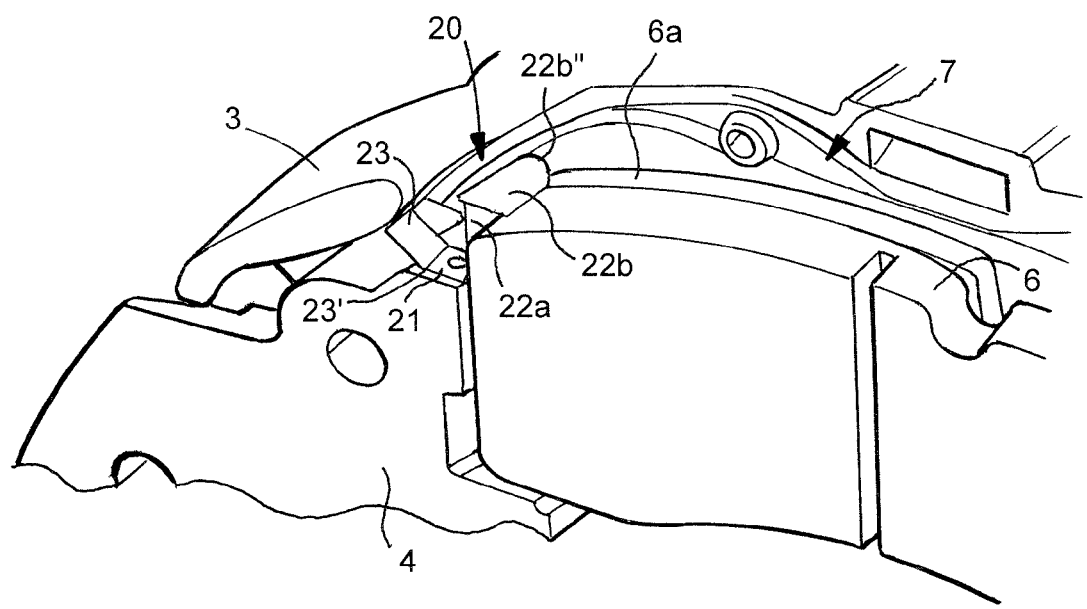
FIG. 3 is a cross-sectional view of the brake system of FIG. 2.

As shown in FIG. 3, the brake pad hold down spring 20 of the present embodiment is positioned within aperture 7 in a region of aperture 7 proximate to a longitudinal end of brake pad 6, between brake caliper 3 and brake carrier 4, with distal end 22b" of the horizontal section 22b contacting brake pad 6. In the embodiment depicted in FIG. 3, the distal end 22b" of horizontal section 22b applies a biasing force radially inward to a backing plate 6a of brake pad 6. The brake pad hold down spring 20, however, need not be limited to such arrangement, and may have any configuration as may occur to those of ordinary skill in the art, as long as at least a portion of the horizontal section 22b contacts the brake pad 6. The horizontal section 22b may contact the brake pad 6 in a region immediately adjacent to a longitudinal end of the brake pad 6. The brake pad hold down spring 20, however, need not be limited to such configuration, since the horizontal section 22b may, for example, contact brake pad 6 at various other locations along the length of the brake pad 6, as long as at least a portion of the horizontal section 22b is capable of exerting a radially inward directed force onto brake pad 6 to thereby suppress brake pad kick and vibration during brake system 1 operation.

Preferably, the radially inward force exerted by horizontal section 22b onto brake pad 6 is at least equal to, but opposite in direction to, the force exerted onto the brake pad 6 by brake disc 2, as the brake system 1 is operated, so as to suppress brake pad kick. However, the biasing force exerted by horizontal section 22b onto brake pad 6 may be lower than a radially outward-directed force exerted onto the brake pad 6 by brake disc 2 as the brake system 1 is operated, so as to minimize brake pad kick. Further, distal end 22b" of horizontal section 22b may have any desired shape. For instance, as shown in FIG. 3, the distal end 22b" may be substantially rounded. The distal end 22b", however, need not be limited to such shape, and may have a substantially linear shape, as shown in FIG. 1, or any other polygonal shape, as may occur to those of ordinary skill in the art, as long as distal end 22b" of horizontal section 22b is capable of contacting brake pad 6. Further, the vertical section 22a and the horizontal section 22b may have any desired shape. For instance, as shown in FIGS. 2 and 3, vertical section 22a and horizontal section 22b may have a substantially flat shape. The vertical section 22a and horizontal section 22b, however, need not be limited to such shape, and may have any desired shape as may occur to those of ordinary skill in the art, as long as vertical section 22a and horizontal section 22b extend from the mounting section 21 to the brake pad 6. Moreover, alternate embodiments may lack a horizontal and vertical section altogether, and may, for example, include a single arcuate projection, or a single projection having any desired shape, as long as the first projection, irrespective of its number of sections and irrespective of its overall shape, extends from the mounting section 21 to the brake pad 6.

As shown in FIG. 3, second projection 23 extends from mounting section 21, such that distal end 23" of the second projection 23 is arranged to contact an inner surface of brake caliper 3. The second projection 23 may extend from the mounting section 21 in any desired projecting direction. For instance, as shown in FIGS. 2 and 3, the second projection 23 may make an oblique angle with respect to mounting section 21, thereby extending in an oblique direction relative to the mounting section 21. The projecting direction of the second projection 23, however, need not be limited to such an arrangement. For instance, in other embodiments, the mounting section 21 may extend to a location that is closer to the inner wall of brake caliper 3, thereby allowing the second projection 23 to project from mounting section 21 in a direction that is substantially perpendicular to mounting section 21 (e.g., substantially parallel to vertical section 22a), as long as distal end 23" of second projection 23 is capable of contacting the inner surface of brake caliper 3. The distal end 23" of the second projection 23 may have any desired shape. For instance, as shown in FIG. 2, distal end 23" may have a substantially linear shape. The distal end 23" of second projection 23, however, need not be limited to such arrangement, and in other embodiments may have any substantially circular, semicircular, or any other polygonal shape as may occur to those of ordinary skill in the art, as long as distal end 23" is capable of contacting brake caliper 3. Upon contacting brake caliper 3, distal end 23" exerts a biasing force against the brake caliper 3. Preferably, the biasing force exerted by the second projection 23 is of a magnitude sufficient to move the brake caliper 3 away from the brake carrier 4, thereby pre-loading the brake caliper pins (not shown).

The existing brake pad hold down springs are either mounted substantially in the middle of the brake caliper ("middle-mounted springs"), or directly on the ends of the brake pads ("brake-pad-mounted springs"). The middle-mounted springs exert a retaining force only along a midsection of the brake pads. As such, the middle-mounted springs are ineffective at suppressing brake pad kick, because this phenomenon occurs when the leading and trailing ends of the brake pads come into contact with the brake disc, and these ends are not retained in place by the existing middle-mounted springs. Further, because these middle-mounted springs provide a single retention point, the middle-mounted springs are also ineffective at suppressing brake pad vibration, during brake operation. Although the brake-pad-mounted springs address the shortcomings of the middle-mounted springs, the effectiveness of the brake-pad-mounted springs decreases as the brake pads wear down.

Significant benefits of the brake pad hold device according to the present embodiment, over the existing devices, are evident from the foregoing disclosure. The brake pad hold down device according to the present embodiment has a stiffer spring force on the leading side and a less stiff force on the trailing side to mitigate pad kick and vibration. Further, the brake pad hold down device according to the present embodiment has a structure that is easy to manufacture, is cost effective, eliminates the need for separate brackets, retaining pins and other fasteners required by the existing devices, and provides a long term solution to the problem of brake pad kick and brake pad vibration. Due to its shape, the brake pad hold down device according to the present embodiment may be installed on both ends of the brake pads. Moreover, because the brake pad hold down device according to the present invention is fixed to the carrier, rather than directly onto the brake pad, the ability of the brake pad hold down device according to the present embodiment to suppress brake pad kick, vibration and component wear are not reduced over the life of the brake pad.

Figure 4:
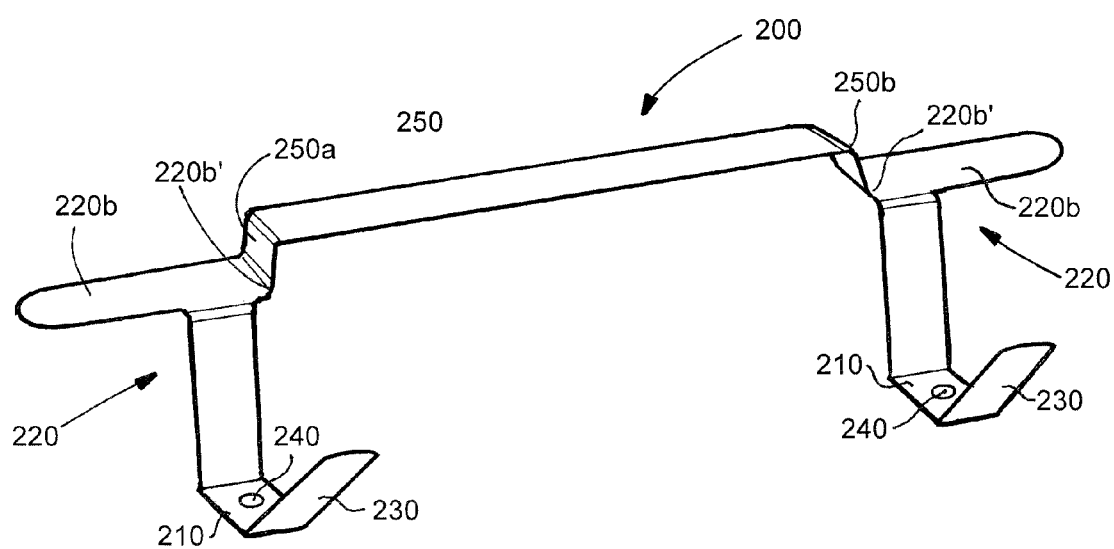
FIG. 4 is a perspective view of a brake pad hold down spring according to another embodiment of the present invention.

Another significant benefit of the brake pad hold down device according to the present embodiment is that it facilitates pre-loading of brake caliper pins as accomplished by section 230 in FIG. 4. When the brake pad hold down device according to the present embodiment is installed, the reaction tab exerts a biasing force against the brake caliper. This biasing force tends to move the brake caliper away from the brake carrier, thereby biasing the brake caliper pins against the brake carrier.

Yet another significant benefit of the brake pad hold down device according to the present embodiment is that it facilitates brake pad installation and removal. The brake pad hold down device according to the present embodiment is configured to fit within the aperture of the brake caliper, and the portion of the brake pad hold down device that retains the brake pad in place is readily accessible upon removal of a vehicle wheel, without the need for removal of the brake caliper. Thus, all that is required to install/remove the brake pads is to push the brake pad hold down device away from the brake pads to then push/pull the brake pads into/out of the brake caliper. Further, because this procedure may be carried out without removal of the brake caliper, the brake pad hold down device according to the present embodiment effectively reduces the time and effort required to perform brake pad installation and removal. Moreover, due to its shape, removal and/or installation of the brake pads does not require the use of special tools or equipment.

Referring to FIGS. 4-8, another embodiment of the brake pad hold down device of the present invention will now be described. As shown in FIG. 4, the brake pad hold down spring 200 in accordance with the present embodiment differs from the previous embodiment in that the brake pad hold down spring 200 of the present embodiment further comprises an elongated body 250 which connects brake pad hold down springs at adjacent ends of two brake pads. As shown in FIG. 4, the elongated body 250 has a first end 250*a* that is immediately adjacent to a proximal end 220*b'* of a horizontal section 220*b*, and second end 250*b* that is immediately adjacent to another proximal end 220*b'* of another horizontal section 220*b*, so that the brake pad hold down spring 200 of the present embodiment includes a mounting section 210, first projection 220 and second projection 230 on each end of the brake pad hold down spring 200.

Figure 8:
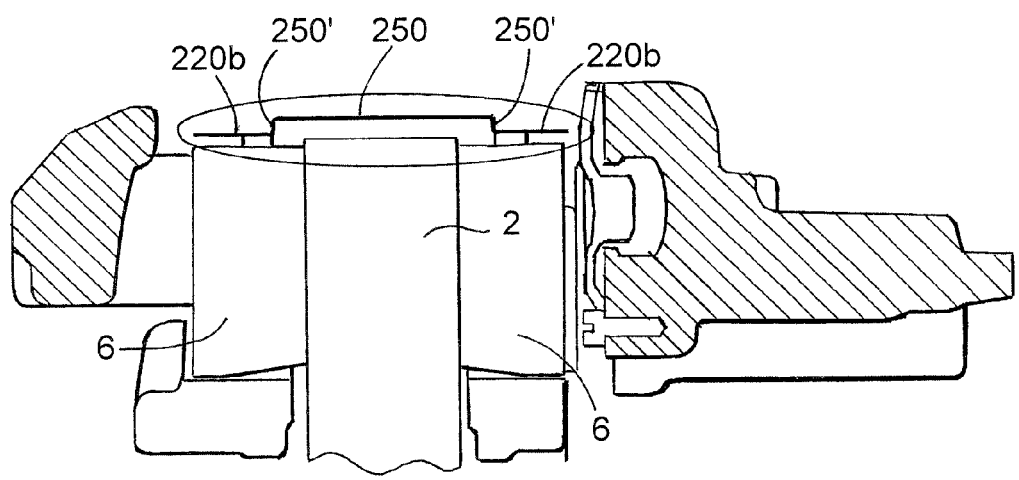
FIG. 8 is a cross-sectional view of the brake system depicted in FIGS. 5-7.

As shown in FIGS. 5-8, when the brake pad hold down spring 200 of the present embodiment is installed in brake system 1, the elongated body 250 extends substantially in the direction of the axis of rotation of the brake disc (illustrated in FIG. 1 as axial direction B), so as to straddle brake disc 2. As shown in FIG. 8, each end of the elongated body includes a vertical region 250' that extends upward from the mounting section, and which provides a clearance between the elongated body 250 and brake disc 2. Such a configuration allows the brake pad hold down spring 200 to operate without interfering with rotation of brake disc 2. Further, as shown in FIG. 8, horizontal sections 220*b* extend from vertical regions 250' toward brake pads 6, thereby giving the radially outer portion of the brake pad hold down spring 200 of the present embodiment flanged ends. The brake pad hold down spring 200, however, need not be limited to such configuration. For instance, in other embodiments the elongated body 250 may, for example, have a substantially arcuate shape, or any other polygonal shape as may occur to those of ordinary skill in the art, as long as the elongated body 250 does not contact brake disc 2 during brake system 1 operation.

Figure 5:
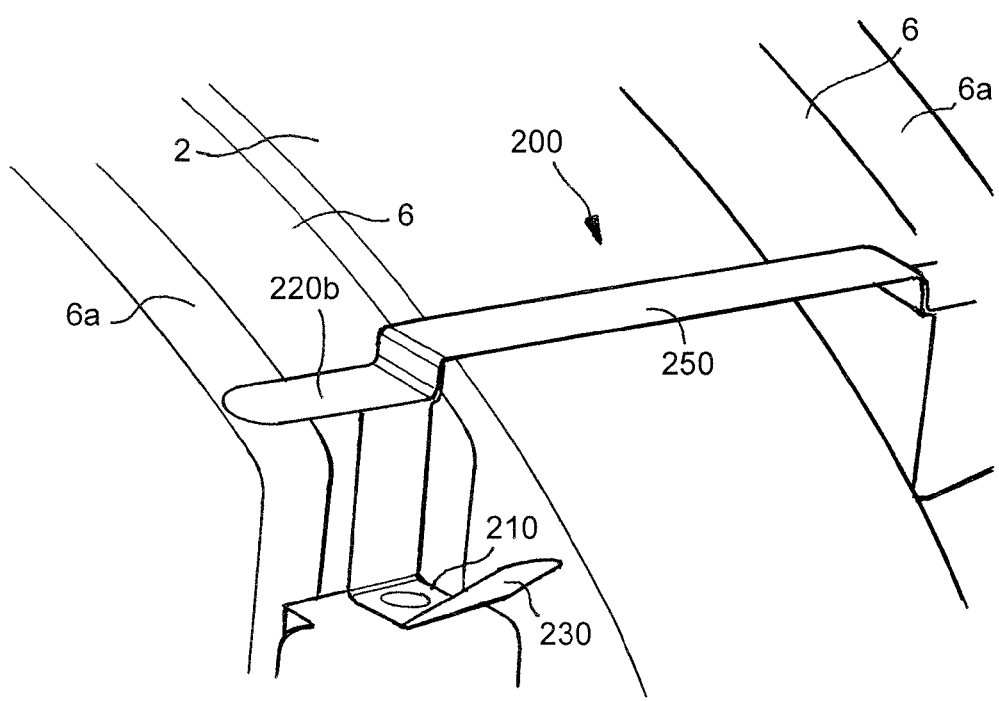
FIG. 5 is close-up perspective view of a brake system including the brake pad hold down spring of FIG. 4.
Figure 6:
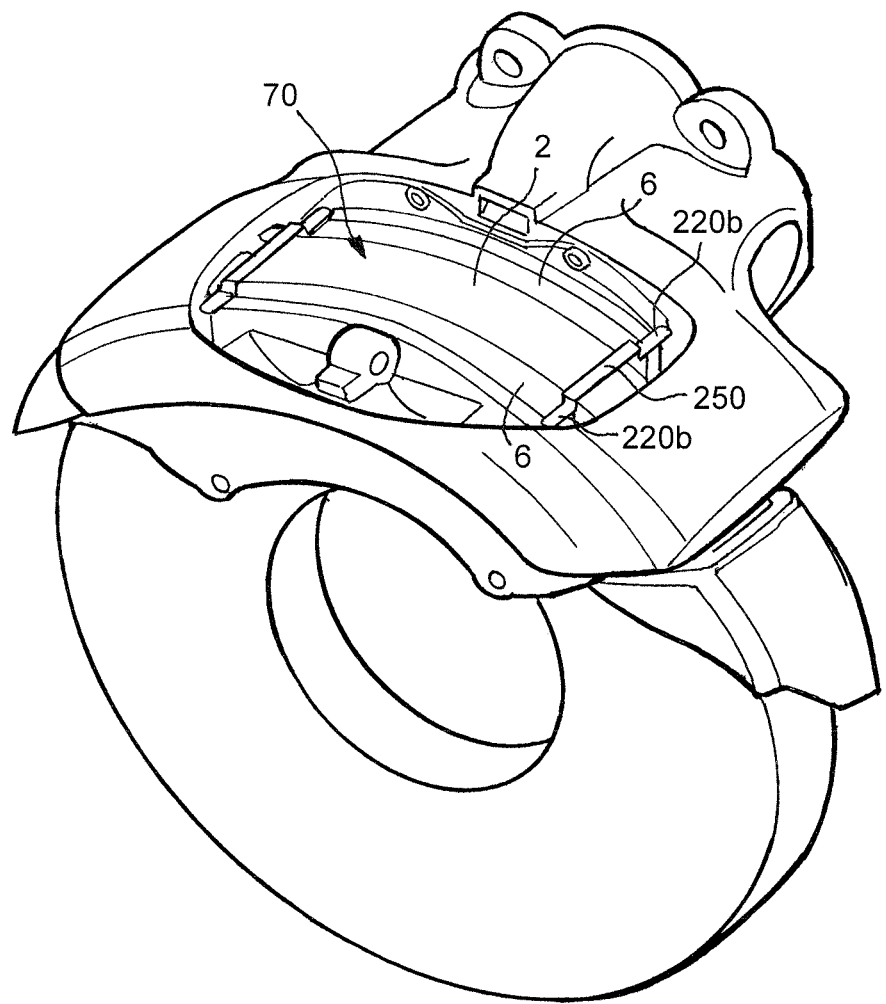
FIG. 6 is a perspective view of a brake system including the brake pad hold down spring of FIG. 4.
Figure 7:
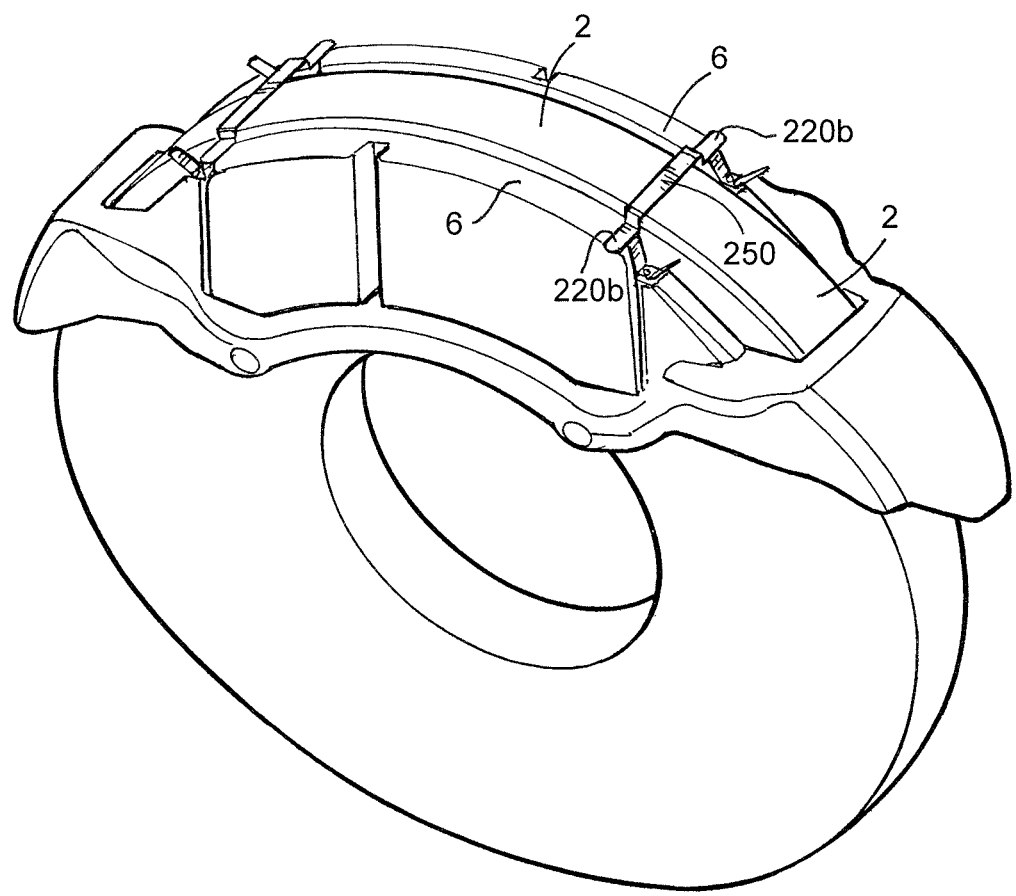
FIG. 7 is a perspective view of the brake system of FIG. 6 with the brake caliper removed.

As shown in FIGS. 5-8, the brake pad hold down spring 200 of the present embodiment has two horizontal sections 220*b* located at each end thereof, which contact two different brake pads 6 located on opposite sides of brake disc 2. As shown in FIGS. 5 and 6, the brake pad hold down spring 200 of the present embodiment is similarly disposed within aperture 70. However, because brake pad hold down spring 200 contacts longitudinal ends of two different brake pads 6, only two brake pad hold down springs 200 are needed to retain both brake pads 6, within brake caliper 4.

As evidenced by the foregoing disclosure, the brake pad hold down device according to the present embodiment exhibits the same benefits over the existing devices discussed above, as well as at least the following additional benefits. First, the brake pad hold down device according to the present embodiment exhibits improved rigidity and strength relative to single, independent devices by joining together two of the inventive brake pad hold down devices. This configuration improves the ability of the brake pad hold down device according to the present embodiment to transfer loads between the multiple mounting points, while the addition of the elongated body augments rigidity of the brake pad hold down device.

Another significant benefit of the brake pad hold down device according to the present embodiment is that it further facilitates installation and removal of the brake pads. The brake pad hold down device according to the present embodiment may include a removal assistance feature for exerting a force in the circumferential direction to displace the brake pad hold down device, such as a radially-outward oriented tab which may be pressed by a technician or a slot into which a removal/installation tool may be inserted. This removal assistance feature is formed by a portion of the elongated body that defines a clearance between the elongated body and the brake disc. Such a location for the removal assistance feature is easily accessible, thereby further improving access for installation and/or removal tools.

Another embodiment of the present invention is directed to a method of installing and removing brake pads in a brake system including a brake pad hold down device according to the foregoing embodiments. The method includes the acts of applying a force to the first projection (22, 220) in a circumferential direction away from an installed position of brake pad 6, inserting the brake pad 6 into an opening in the brake carrier 4 to the installed position, and releasing the force applied to the first projection (22, 220) to permit the first projection (22, 220) to assume a position over the brake pad 6 to apply the first biasing force to the brake pad 6. A similar procedure may be used to extract a brake pad.

The foregoing disclosure has been set forth merely to illustrate the invention and is not intended to be limiting. For example, the brake pad hold down spring (20, 200) may be integrally formed. As used herein, the term "integrally formed" means fused or made into a single unitary piece, such as, being stamped from a single sheet. Alternatively, the brake pad hold down spring (20, 200) may be constructed of two or more pieces, each of which is held together by a fastening means, such as a fastener, weld, or any other fastening means that may occur to those of ordinary skill in the art. Further, the brake pad hold down spring (20, 200) may be made substantially of a single material, or a plurality of materials, as long as the material of the brake pad hold down spring is capable of undergoing elastic deformation over the range of motion required for installation and removal of the brake pads. The brake pad hold down spring (20, 200) may be formed of metal, or any other material capable of undergoing elastic deformation and exerting a biasing force as may occur to those of ordinary skill in the art. Moreover, the brake pad hold down spring of the present invention may include portions with different shapes or thicknesses to increase or decrease the material strength of the various portions of the above-disclosed embodiments. Because these and other such modifications of the disclosed embodiments incorporating the spirit and substance of the invention may occur to persons of ordinary skill in the art, the invention should be construed to include everything within the scope of the appended claims and equivalents thereof.

The invention claimed is:

1. A structure for retaining a brake pad within a brake caliper, the structure comprising:
   a mounting section configured to mount the structure on a brake carrier;
   a first projection extending from a first region of the mounting section to the brake pad, the first projection being configured to apply a first biasing force to the brake pad; and
   a second projection extending from a second region of the mounting section that contacts the brake carrier to an inner surface of the brake caliper, the second projection having a distal end that contacts the inner surface of the brake caliper, to thereby apply a second biasing force thereto.

2. The structure according to claim 1, wherein
   the first projection is configured to contact a backing plate of the brake pad in a region proximate to a longitudinal end of the brake pad.

3. The structure according to claim 1, wherein
   the first region of the mounting section and the second region of the mounting section are located on opposite ends of the mounting section.

4. The structure according to claim 1, wherein
the second biasing force is at least equal to a force that is necessary to bias brake caliper pins against the brake caliper, and
a magnitude of the first biasing force and a magnitude of the second biasing force are either the same or different.

5. The structure according to claim 1, wherein
the mounting section defines at least one opening that is configured to accommodate passage of a fastener therethrough.

6. The structure according to claim 1, wherein
the mounting section, the first projection, and the second projection are integrally formed.

7. The structure according to claim 6, wherein
at least a portion of the first projection and the mounting section are substantially parallel to one another.

8. The structure according to claim 7, wherein
at least a portion of the first projection is substantially perpendicular to another portion of the first projection, and the mounting section.

9. The structure according to claim 8, wherein
the second projection extends from the mounting section at an oblique angle thereto.

10. The structure according to claim 9, wherein
the first projection includes a vertical section that extends substantially upward from the mounting section and a horizontal section that extends substantially along a width direction of the brake pad.

11. A structure for retaining a brake pad within a brake caliper, the structure comprising:
a mounting section configured to mount the structure on a brake carrier;
a first projection extending from a first region of the mounting section to the brake pad, the first projection being configured to apply a first biasing force to the brake pad;
a second projection extending from a second region of the mounting section that contacts the brake carrier to an inner surface of the brake caliper, the second projection having a distal end that contacts the inner surface of the brake caliper, to thereby apply a second biasing force thereto; and
an elongated body configured to connect one end thereof to the first projection of the structure and another end thereof to another first projection of another structure.

12. The structure according to claim 11, wherein
the first projection is configured to contact a backing plate of the brake pad in a region proximate to a longitudinal end of the brake pad.

13. The structure according to claim 11, wherein
the first region of the mounting section and the second region of the mounting section are located on opposite ends of the mounting section.

14. The structure according to claim 11, wherein
the second biasing force is at least equal to a force that is necessary to bias brake caliper pins against the brake caliper, and
a magnitude of the first biasing force and a magnitude of the second biasing force are either the same or different.

15. The structure according to claim 11, wherein
the mounting section defines at least one opening that is configured to accommodate passage of a fastener therethrough.

16. The structure according to claim 11, wherein
the mounting section, the first projection, the elongated body and the second projection are integrally formed.

17. The structure according to claim 16, wherein
the elongated body is configured to overlap a brake disc, when the mounting section is mounted on the brake carrier.

18. The structure according to claim 17, wherein
at least a portion of the first projection, the elongated body and the mounting section are substantially parallel to one another.

19. The structure according to claim 18, wherein
the elongated body and at least a portion of the first projection are substantially perpendicular to another portion of the first projection, and the mounting section.

20. The structure according to claim 19, wherein
the second projection extends from the mounting section at an oblique angle thereto.

21. The structure according to claim 20, wherein
the first projection includes a vertical section that extends substantially upward from the mounting section and a horizontal section that extends substantially along a width direction of the brake pad.

22. A structure for retaining longitudinal ends of a pair of brake pads within a brake caliper, the structure comprising:
an elongated body having ends that are each configured to exert a downward force onto a backing plate of one of the pair of brake pads; and
a pair of projections that extend from each end of the elongated body, each of the pair of projections including
a first portion that is configured to mount the structure to a brake carrier, and
a second portion that is configured to exert a biasing force against an inner wall of the brake caliper, wherein at a first end thereof of the second portion contacts the brake carrier, and at a second end thereof the second portion contacts the inner surface of the brake caliper.

23. The structure according to claim 22, wherein
the ends of the elongated body are configured to exert the downward force in regions proximate to the longitudinal ends of the pair of brake pads.

24. The structure according to claim 23, wherein
the elongated body extends substantially along a first direction, and the pair of projections extend substantially along a second direction that is orthogonal to the first direction.

25. A brake pad retaining system comprising:
means for generating a biasing force that retains a brake pad within a brake caliper, the biasing force being exerted radially-inwardly onto an area of the brake pad proximate to a longitudinal end of the brake pad;
means for biasing at least one brake caliper mounting pin against the brake caliper; and
means for mounting the brake pad retaining system on a brake carrier, wherein said means for mounting the brake pad retaining system includes a biasing portion having a first end that contacts the brake carrier and a second end that contacts the inner surface of the brake caliper.

26. The system according to claim 25, wherein the means for generating the biasing force includes at least two biasing force generating devices further comprising means for connecting the at least two biasing force generating devices on opposite sides of a brake disc.

27. A method for installing a brake pad in a brake system, the method comprising the acts of:
applying a force to a first projection in a circumferential direction away from an installed position of the brake pad;

inserting the brake pad into an opening in a brake carrier to the installed position;

releasing the force applied to the first projection to permit the first projection to assume a position over the brake pad in which the first projection applies a first biasing force to a longitudinal end of the brake pad, wherein the brake system includes a brake caliper, the brake carrier, a brake disc and a brake pad retaining structure, the brake pad retaining structure including a mounting section configured to mount the structure on the brake carrier, the first projection extending from a first region of the mounting section to the brake pad, the first projection being configured to apply the first biasing force to the longitudinal end of the brake pad, and a second projection extending from a second region of the mounting section that contacts the brake carrier to an inner surface of the brake caliper, the second projection having a distal end that contacts the inner surface of the brake caliper, to thereby apply a second biasing force thereto.

28. A disc brake system comprising:
a brake carrier;
a brake caliper mounted on the brake carrier;
a pair of brake pads disposed in the brake caliper;
a brake disc interposed between the pair of brake pads; and
a brake pad retaining spring that is mounted on the brake carrier, the brake pad retaining spring comprising:
  a substantially-flat elongated body that is configured to overlap the brake disc, the substantially-flat elongated body having flanged ends, each flanged end being configured to exert a downward force onto a region of one of the pair of brake pads that is proximate to a longitudinal end thereof;
  a pair of substantially-flat mounting portions that are configured to fasten the brake pad retaining spring to sections of the brake carrier that are on opposite sides of the brake disc;
  a pair of substantially-flat vertical portions, each substantially-flat vertical portion being configured to extend vertically downward from each flanged end to a respective one of the pair of substantially-flat mounting portions; and
  a pair of substantially-flat caliper pre-loading tabs, each substantially-flat caliper pre-loading tab being configured: i) to extend from the respective one of the pair of substantially-flat mounting portions, that contact the brake carrier, at an oblique angle thereto, and ii) to exert a biasing force, via a distal end that contacts an inner surface of the brake caliper, that biases brake caliper mounting pins against the brake caliper.

* * * * *